(No Model.)
A. T. HERSEE.
FLOORING.
No. 586,900. Patented July 20, 1897.
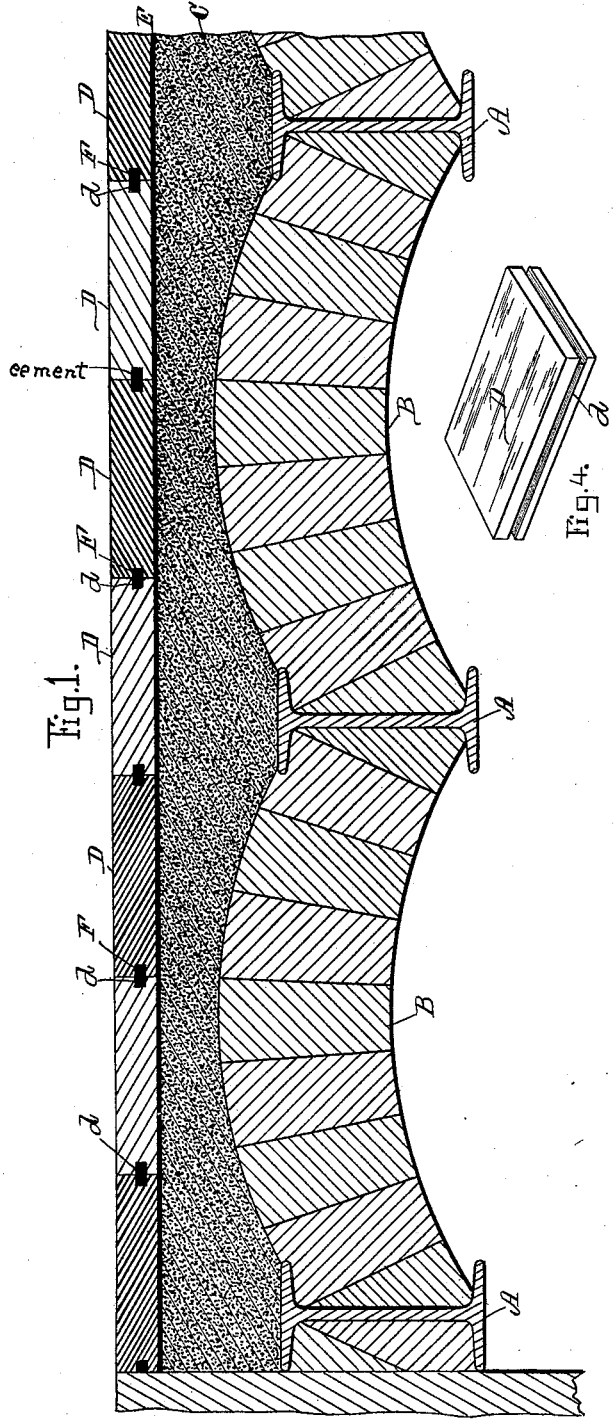
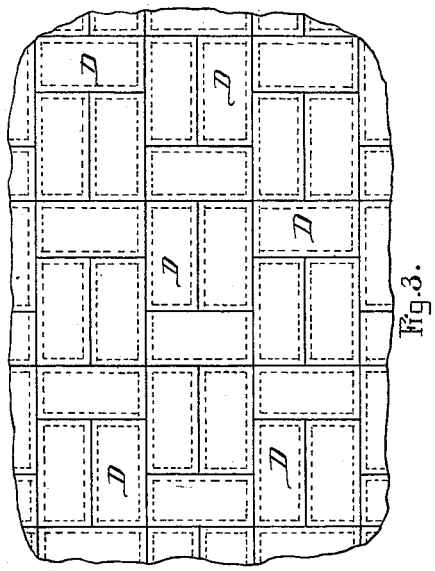
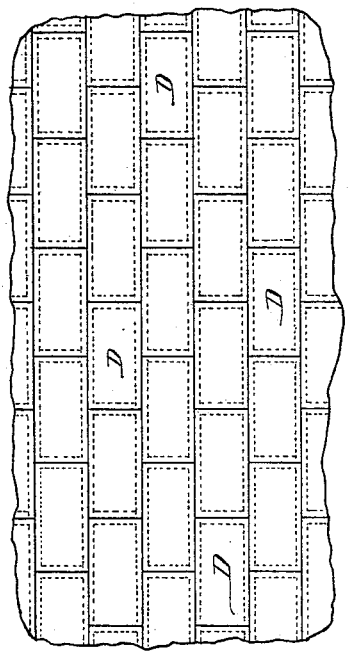
Witnesses.
Inventor.
Alfred T. Hersee

UNITED STATES PATENT OFFICE.

ALFRED T. HERSEE, OF BOSTON, MASSACHUSETTS.

FLOORING.

SPECIFICATION forming part of Letters Patent No. 586,900, dated July 20, 1897.

Application filed December 14, 1896. Serial No. 615,541. (No model.)

*To all whom it may concern:*

Be it known that I, ALFRED T. HERSEE, a citizen of the United States, and a resident of Boston, in the county of Suffolk and State of Massachusetts, have invented new and useful Improvements in Flooring, of which the following, taken in connection with the accompanying drawings, is a specification.

This invention relates to improvements in flooring for fireproof buildings, and it is carried out as follows, reference being had to the accompanying drawings, wherein—

Figure 1 represents a cross-section of the invention. Figs. 2 and 3 represent top plan views of the same, and Fig. 4 represents a perspective view of one of the grooved wooden floor-pieces.

Similar letters refer to similar parts wherever they occur on the different parts of the drawings.

In the drawings, Fig. 1, A A A represent metal I-beams, the ends of which are suitably secured in the walls or partitions, as is usual in fireproof buildings. B B represent brick arches supported on and extending between said I-beams, as shown. C represents a layer of concrete laid in plastic form on top of the I-beams and brick arches, which concrete, after being leveled and allowed to set and harden, serves as a bed for the improved flooring, which consists of a series of wooden plates D of suitable size and thickness, each such plate having at it sides a groove $d$, as shown in the drawings.

In laying the wooden plates on the concrete C, I first apply to the top surface of such concrete a layer of plastic cement E, onto which the wooden plates are laid, one at a time, and caused to adhere firmly to such cement.

The composition of plastic cement E will vary according to the particular location of the flooring. For walls and ceilings I use a solution of silicate of soda and wheat or cereal flour; for dry places, as floors above water-level, I use a solution of silicate of soda and fire-clay, and for floors in basements below water-level I use pitch or bitumen with common coal or stockhalm tar.

In laying the wooden plates D in position one against the other I fill the grooves $d$ thereon with a suitable plastic composition F, preferably composed of pitch and tar or rosin and pine tar, and also put such composition on the adjoining edges of the wooden plates, which are then brought in close contact with each other, causing the edges of the plate to be, as it were, glued together and causing the plastic composition F when hardened to form composition tongues embedded in the grooves on the wooden plates D, thus serving to hold said plates firmly united together.

In Figs. 2 and 3 I have shown the wooden plates of rectangular form arranged in different patterns, and I wish to state that I do not confine myself to any particular shape or arrangement of said blocks, as any desired form or shape of blocks may be used and arranged in any desired pattern without departing from the essence of my invention. By this arrangement I am able to lay a wooden marquetry floor on fireproof supports without the use of nails or other fasteners, and in this manner I cause the wooden plates of which the improved floor is composed to adhere firmly to the underlying support or surface, as well as causing the plates in the series to be firmly attached to each other.

What I wish to secure by Letters Patent and claim is—

The herein-described fireproof flooring consisting of a suitable supporting-base B, a body of concrete C, laid upon said supporting-base, a layer of plastic cement E, placed upon the top surface of the concrete body, and a series of wooden plates D, having their under sides firmly united to said plastic cement layer and their adjacent side edges cemented together, and each plate having meeting side grooves $d$, filled with plastic material F, to form interlocking tongues, substantially as described.

In testimony whereof I have signed my name to this specification, in the presence of two subscribing witnesses, on this 30th day of November, A. D. 1896.

ALFRED T. HERSEE.

Witnesses:
 ALBAN ANDRÉN,
 LAURITZ N. MÖLLER.